(12) United States Patent
Bergquist et al.

(10) Patent No.: US 11,354,951 B2
(45) Date of Patent: Jun. 7, 2022

(54) METHODS FOR DIAGNOSING ERROR OF AN EGO VEHICLE AND/OR A SURROUNDING VEHICLE

(71) Applicant: Volvo Truck Corporation, Gothenburg (SE)

(72) Inventors: Stefan Bergquist, Gothenburg (SE); Wilhelm Wiberg, Askim (SE)

(73) Assignee: Volvo Truck Corporation, Gothenburg (SE)

( * ) Notice: Subject to any disclaimer, the term of this patent is extended or adjusted under 35 U.S.C. 154(b) by 232 days.

(21) Appl. No.: 16/757,277

(22) PCT Filed: Oct. 20, 2017

(86) PCT No.: PCT/EP2017/076834
§ 371 (c)(1),
(2) Date: Apr. 17, 2020

(87) PCT Pub. No.: WO2019/076464
PCT Pub. Date: Apr. 25, 2019

(65) Prior Publication Data
US 2021/0192870 A1 Jun. 24, 2021

(51) Int. Cl.
*G07C 5/08* (2006.01)
*B60W 50/02* (2012.01)
(Continued)

(52) U.S. Cl.
CPC .......... *G07C 5/085* (2013.01); *B60W 50/0205* (2013.01); *G07C 5/008* (2013.01);
(Continued)

(58) Field of Classification Search
CPC .......... G07C 5/085; G07C 5/008; G07C 5/04; B60W 50/0205
(Continued)

(56) References Cited

U.S. PATENT DOCUMENTS

2018/0322784 A1* 11/2018 Schild .................... G08G 1/163

FOREIGN PATENT DOCUMENTS

DE 102011113316 A1 * 3/2012 ............... G01D 1/18
DE 102011113316 A1   3/2012
(Continued)

OTHER PUBLICATIONS

International Search Report and Written Opinion for International Patent Application No. PCT/EP2017/076834, dated Jul. 9, 2018, 12 pages.

*Primary Examiner* — Isaac G Smith
(74) *Attorney, Agent, or Firm* — Withrow & Terranova, PLLC

(57) ABSTRACT

The invention relates to a method for diagnosing error of at least one of an ego vehicle (10) and a surrounding vehicle (12), which method comprises the steps of: the ego vehicle (10) receiving (S1) sensor data about the surrounding vehicle (12) from an on-board sensor (14) of the ego vehicle (10) and vehicle to vehicle data from the surrounding vehicle (12); the ego vehicle (10) comparing (S2) the received sensor data and the received vehicle to vehicle data; and the ego vehicle (10) detecting (S3) a difference between the received sensor data and the received vehicle to vehicle data, whereby the ego vehicle (10): stops (S4) receiving vehicle to vehicle data from the surrounding vehicle (12); registers (S5) a potential error of the ego vehicle (10); and reports (S6) a potential error of the surrounding vehicle (12) to at least one of the surrounding vehicle (12) and a remote server (18). The invention also concerns a method for diagnosing error of a surrounding vehicle (12).

12 Claims, 6 Drawing Sheets

(51) Int. Cl.
  *G07C 5/00* (2006.01)
  *G07C 5/04* (2006.01)
  *G05D 1/02* (2020.01)

(52) U.S. Cl.
  CPC ......... *G07C 5/04* (2013.01); *B60W 2050/021* (2013.01); *B60W 2556/65* (2020.02); *G05D 1/0276* (2013.01)

(58) Field of Classification Search
  USPC ...................................................... 701/31.7
  See application file for complete search history.

(56) References Cited

FOREIGN PATENT DOCUMENTS

| | | |
|---|---|---|
| DE | 102011017593 A1 | 10/2012 |
| DE | 102012211391 A1 | 1/2014 |
| DE | 102015221439 B3 | 5/2017 |
| WO | 2012/011895 A1 | 1/2012 |
| WO | 2016/178613 A1 | 11/2016 |
| WO | 2017/174108 A1 | 10/2017 |

* cited by examiner

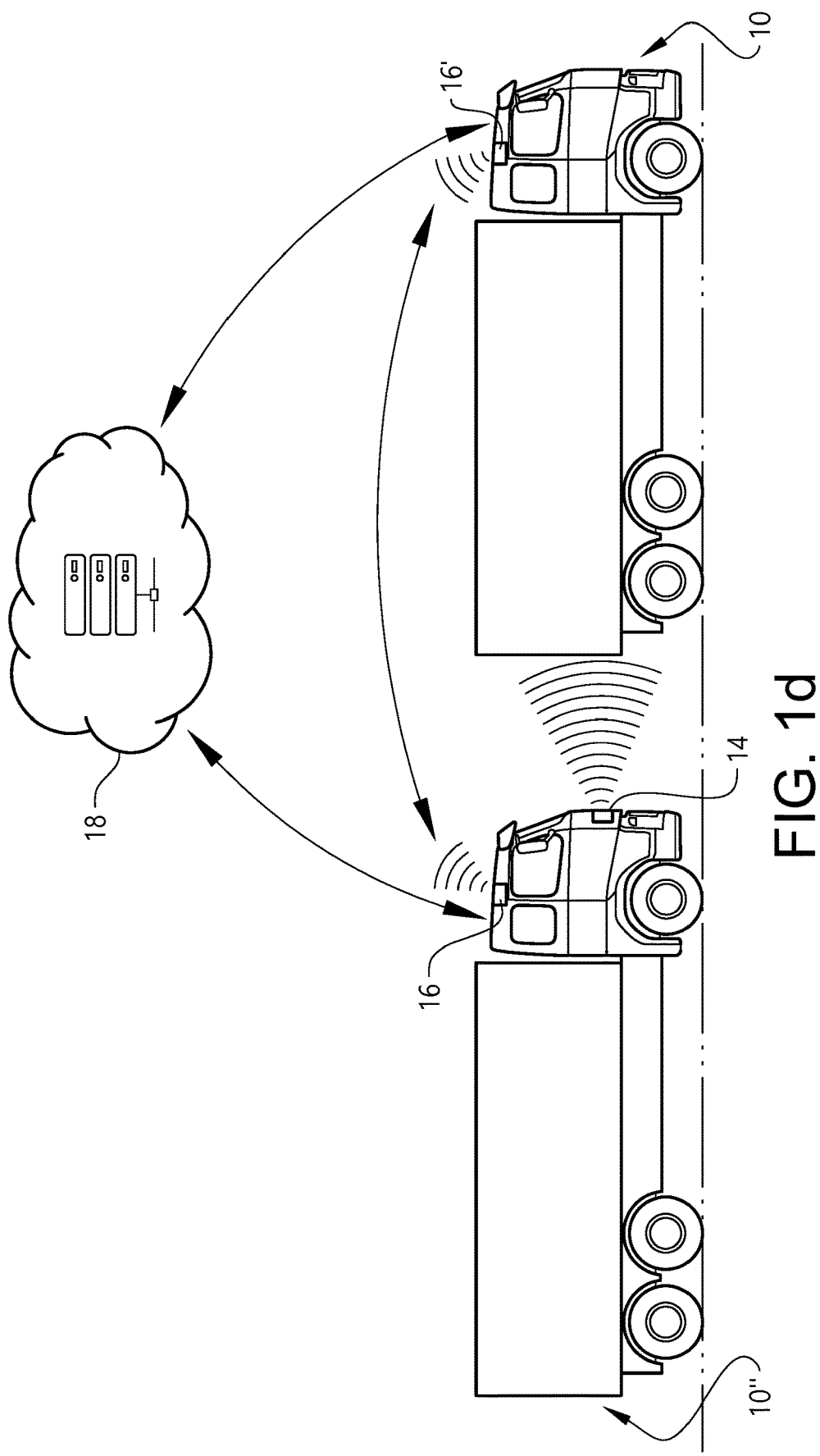

METHODS FOR DIAGNOSING ERROR OF AN EGO VEHICLE AND/OR A SURROUNDING VEHICLE

This application is a 35 USC 371 national phase filing of International Application No. PCT/EP2017/076834, filed Oct. 20, 2017, the disclosure of which is incorporated herein by reference in its entirety.

TECHNICAL FIELD

The invention relates to a method for diagnosing error of at least one of an ego vehicle and a surrounding vehicle. The invention also concerns an interrelated method for diagnosing error of a surrounding vehicle.

The invention can be applied in heavy-duty vehicles, such as trucks, buses and construction equipment. Although the invention will be described with respect to trucks, the invention is not restricted to this particular vehicle, but may also be used in other vehicles such as cars.

BACKGROUND

Vehicles today come equipped with on-board sensors such as radar and camera for detecting surrounding vehicles. This information is used to control the distance to the preceding vehicle in ACC (autonomous/adaptive cruise control) driving, or to automatically brake the vehicle if a collision is imminent. It is obvious that error in the data can lead to serious consequences and there are examples where erroneous sensors have caused collisions.

In a few years, V2V communication will be added to vehicles. This will be used to send information about the ego vehicle and listen to information sent from surrounding vehicles. This information will be used to control the equipped vehicle's brakes and acceleration in for example platooning and cooperative emergency braking.

However, given the nature of wireless communication and the fact that vehicles have to listen to data from sensors that they have no control over (sensors equipped in other vehicles) there is a considerable risk that erroneous data will be received on occasion.

DE 10 2011 017 593 A1 discloses an errors detecting device having a data interface for receiving information over surroundings of a vehicle. Another data interface is provided for retrieving another information over the surroundings of the vehicle. An evaluation unit is provided for comparing the both informations in such a manner that a fault is detected, when the former information deviates over a predetermined amount of the latter information. According to DE 10 2011 017 593 A1, the device makes it possible to detect whether an environmental sensor of the vehicle is still functioning or, for example, because of dirtiness, is blocked or disturbed. The device may have a memory which may serve to store a result of the error detection.

DE 10 2015 221 439 discloses a method for displaying sensor data of one or more first vehicles via a human-machine interface of a second motor vehicle.

DE 10 2011 113 316 relates to a method for analyzing sensor data, wherein a first sensor signal measured by a first sensor and a second sensor signal measured by a second sensor are read in and processed.

All references mentioned above are incorporated herein by reference in their entireties.

SUMMARY

An object of the invention is to provide an improved method for diagnosing error.

According to a first aspect of the invention, the object is achieved by a method according to claim 1. According to a second aspect of the invention, the object is achieved by a method according to claim 13.

According to the first aspect, there is provided a method for diagnosing error of at least one of an ego vehicle and a surrounding vehicle, which method comprises the steps of: the ego vehicle receiving sensor data about the surrounding vehicle from an on-board sensor of the ego vehicle and vehicle to vehicle data from the surrounding vehicle; the ego vehicle comparing the received sensor data and the received vehicle to vehicle data; and the ego vehicle detecting a difference between the received sensor data and the received vehicle to vehicle data, whereby the ego vehicle: stops receiving vehicle to vehicle data from the surrounding vehicle; registers a potential error of the ego vehicle; and reports a potential error of the surrounding vehicle to at least one of the surrounding vehicle and a remote server.

The present invention is based on the understanding that by stop receiving vehicle to vehicle data from the surrounding vehicle in response to the detected difference, safety may immediately be improved, because the difference may be caused by an error in the surrounding vehicle, which error otherwise could cause accidents. Furthermore, by reporting the potential error of the surrounding vehicle to the surrounding vehicle, the surrounding vehicle may conveniently get feedback that it may have an error. Furthermore, by reporting the potential error of the surrounding vehicle to the remote server, a standardized solution independent of vehicles manufacturers' implementations may be realized, and a potential error of the surrounding vehicle can be acknowledged even if the surrounding vehicle cannot receive data. The present method may also allow diagnosing which of the vehicles that has an error. For example, if two different ego vehicles report a potential error of the surrounding vehicle to the remote server, it is likely that the surrounding vehicle has an error (which information can be communicated back to the ego vehicles).

The ego vehicle may further detect a difference between received sensor data and received vehicle to vehicle data of at least one other surrounding vehicle and register at least one other potential error of the ego vehicle, wherein each registered potential error of the ego vehicle increases a (first) fault counter of the ego vehicle, and wherein an error of the ego vehicle is declared if the fault counter of the ego vehicle exceeds a predetermined threshold. By taking into at account vehicle to vehicle data of at least one other surrounding vehicle and use a fault counter and predetermined threshold, the likelihood that an error of the ego vehicle is correctly declared is increased. Typically, at least two registered potential errors with respect to different surrounding vehicles are needed to exceed the predetermined threshold and declare an error of the ego vehicle. Use of sensor data from the on-board sensor may be inhibited if an error of the ego vehicle is declared, because the error of the ego vehicle is likely an error of the on-board sensor of the ego vehicle. Alternatively, the error of the ego vehicle could be an error of a vehicle to vehicle communications unit of the ego vehicle.

In one embodiment, the fault counter of the ego vehicle is decreased over time. In this way, potential errors of the vehicle are "healed" over time, such that differences detected at long intervals do not necessarily cause a declaration of error. This may further improve the correctness of the error declaration.

In another embodiment, the ego vehicle further detects a match between received sensor data and received vehicle to vehicle data of at least one other surrounding vehicle, wherein each match decreases the fault counter of the ego vehicle. That is, matches between received sensor data and received vehicle to vehicle data may indicate that there is no error and hence "heal" the potential error(s) of the ego vehicle, so that an error is not declared prematurely. This may further improve the correctness of the error declaration. Each registered potential error of the ego vehicle may increase the fault counter of the ego vehicle by a greater amount than what each match decreases the fault counter of the ego vehicle. That is, several matches are needed to compensate for one registered potential error.

Preferably, the fault counter of the ego vehicle cannot be decreased below a predetermined limit. In this way, the threshold may be exceeded and an error of the ego vehicle may be declared, despite an excessive amount of matches or lapsed time without any registered potential error.

The fault counter of the ego vehicle may be maintained in at least one of the ego vehicle and the remote server. In the former case, the fault counter is locally maintained, and the potential error of the ego vehicle does not have to be registered outside the ego vehicle, which may reduce data communication from the ego vehicle. In the latter case, the fault counter can readily be utilized globally, so that a declared error of the ego vehicle for example can be communicated to other vehicles.

The method may further comprise the steps of: receiving the potential error of the surrounding vehicle reported from the ego vehicle; and receiving at least one other potential error of the surrounding vehicle reported from at least one other ego vehicle, wherein each received potential error of the surrounding vehicle increases a fault counter of the surrounding vehicle, and wherein an error of the surrounding vehicle is declared if the fault counter of the surrounding vehicle exceeds a predetermined threshold. The present method may hence also identify or detect an error of the surrounding vehicle.

The ego vehicle 10 can also "act" as a surrounding vehicle and receive errors reported from other ego vehicles. To this end, the method may further comprise the steps of: receiving a potential error of the ego vehicle reported from another ego vehicle, wherein each received potential error of the ego vehicle increases a (second) fault counter of the ego vehicle, and wherein an error of the ego vehicle is declared if the fault counter of the ego vehicle exceeds a predetermined threshold. Hence, there may be two fault counters for the ego vehicle: a first fault counter for potential errors registered by itself and a second fault counter for potential errors reported by other ego vehicles. Having two different fault counters may improve traceability.

The remote server may be adapted to maintain a list of vehicles with declared errors, including the aforementioned ego vehicle and/or surrounding vehicle. The list can be made available to all vehicles communicating with the remote server. Vehicles on the list can be informed that they are on the list and that they should go to service. The list could also be used when distributing pseudonyms to efficiently prevent erroneous vehicles from communicating with other vehicles.

According to the second aspect, there is provided a method of diagnosing error of a surrounding vehicle, which method comprises: receiving a potential error of the surrounding vehicle reported from an ego vehicle; and receiving at least one other potential error of the surrounding vehicle reported from at least one other ego vehicle, wherein each received potential error increases a fault counter of the surrounding vehicle, and wherein an error of the surrounding vehicle is declared if the fault counter of the surrounding vehicle exceeds a predetermined threshold. The method may for example be implemented in the surrounding vehicle or in the aforementioned remote server.

This aspect may exhibit the same or similar features and technical effects as the previous aspect, and vice versa.

For example, at least two potential errors of the surrounding vehicle received from different ego vehicles may be needed to exceed the predetermined threshold and declare an error of the surrounding vehicle. Furthermore, the surrounding vehicle may be inhibited to send vehicle to vehicle data if an error of the surrounding vehicle is declared. Furthermore, the fault counter of the surrounding vehicle may be decreased over time, or at least one detected match between received sensor data and received vehicle to vehicle data of the surrounding vehicle may be reported from at least one other ego vehicle, wherein each match decreases the fault counter of the surrounding vehicle. Each registered potential error of the surrounding vehicle may increase the fault counter of the surrounding vehicle by a greater amount than what each match decreases the fault counter of the surrounding vehicle. Preferably, the fault counter of the surrounding vehicle cannot be decreased below a predetermined limit. Furthermore, the fault counter of the surrounding vehicle may be maintained in at least one of the surrounding vehicle and the remote server.

The invention also relates to a vehicle adapted to perform the method according to the first or second aspect. The vehicle may be the aforementioned ego vehicle or surrounding vehicle.

The invention also relates to a computer program comprising program code means for performing the steps of the first or second aspect when said program is run on a computer.

The invention also relates to a computer readable medium carrying a computer program comprising program code means for performing the steps of the first or second aspect when said program product is run on a computer.

The invention also relates to a control unit for controlling a vehicle, the control unit being configured to perform the steps of the method according to the first or second aspect.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIGS. 1a-d are schematic side views of ego and surrounding vehicles.

DETAILED DESCRIPTION OF EXAMPLE EMBODIMENTS OF THE INVENTION

Figure 1A:
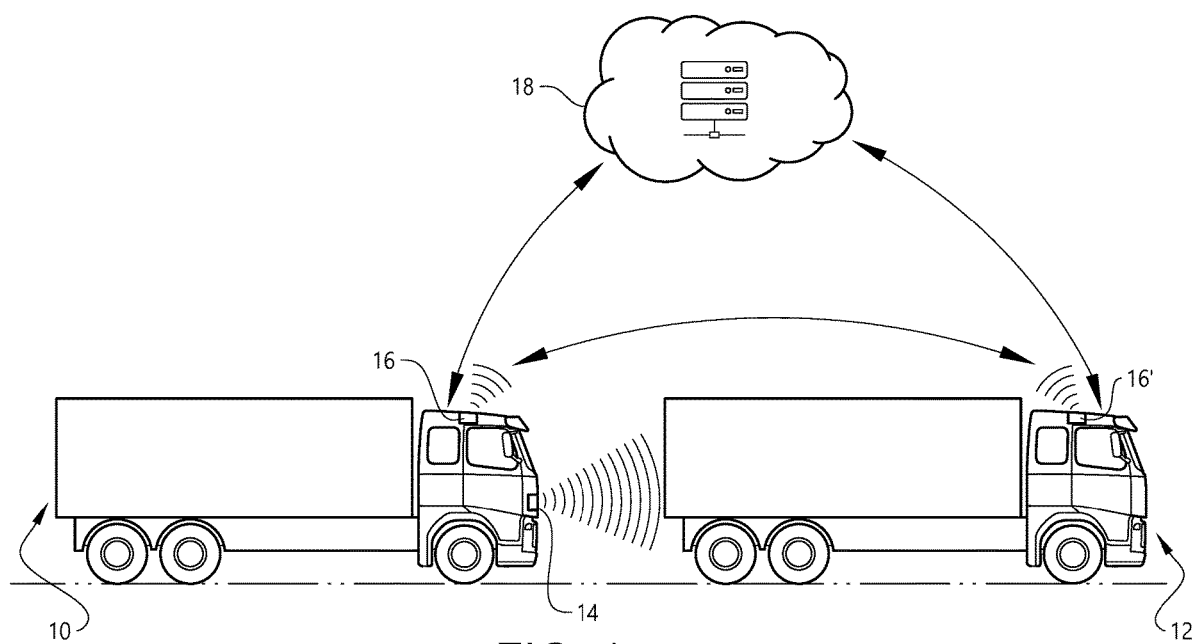

FIG. 1a illustrates an ego vehicle 10 and a surrounding vehicle 12 which may implement aspects of the invention. The ego vehicle 10 and surrounding vehicle 12 are motorized road vehicles. The ego vehicle 10 and the surrounding vehicle 12 are here trucks, but could alternatively be other heavy-duty vehicles, or at least one of them could be a car.

The ego vehicle 10 comprises an on-board sensor 14 and a vehicle to vehicle (V2V) communications unit 16. The on-board sensor 14 is adapted to provide sensor data about surrounding vehicles like the surrounding vehicle 12. The on-board sensor 14 may for example be a radar or a camera. The on-board sensor 14 may be forward facing and adapted to provide sensor data about the surrounding vehicle 12 ahead of the ego vehicle 10. The sensor data about the surrounding vehicle 12 may for example be speed or acceleration or position of the surrounding vehicle 12. The vehicle to vehicle communications unit 16 provides for wireless communication with another vehicle, for example the surrounding vehicle 12. That is, the ego vehicle 10 may receive vehicle to vehicle data, for example speed or acceleration or position of the surrounding vehicle 12, from the surrounding vehicle 12. The surrounding vehicle 12 also comprises a vehicle to vehicle communications unit 16'. Each of the ego vehicle 10 and the surrounding vehicle may also be configured to wirelessly communicate with a remote server 18, for example via Internet. The remote server 18 may form part of a cloud service.

Figure 2:
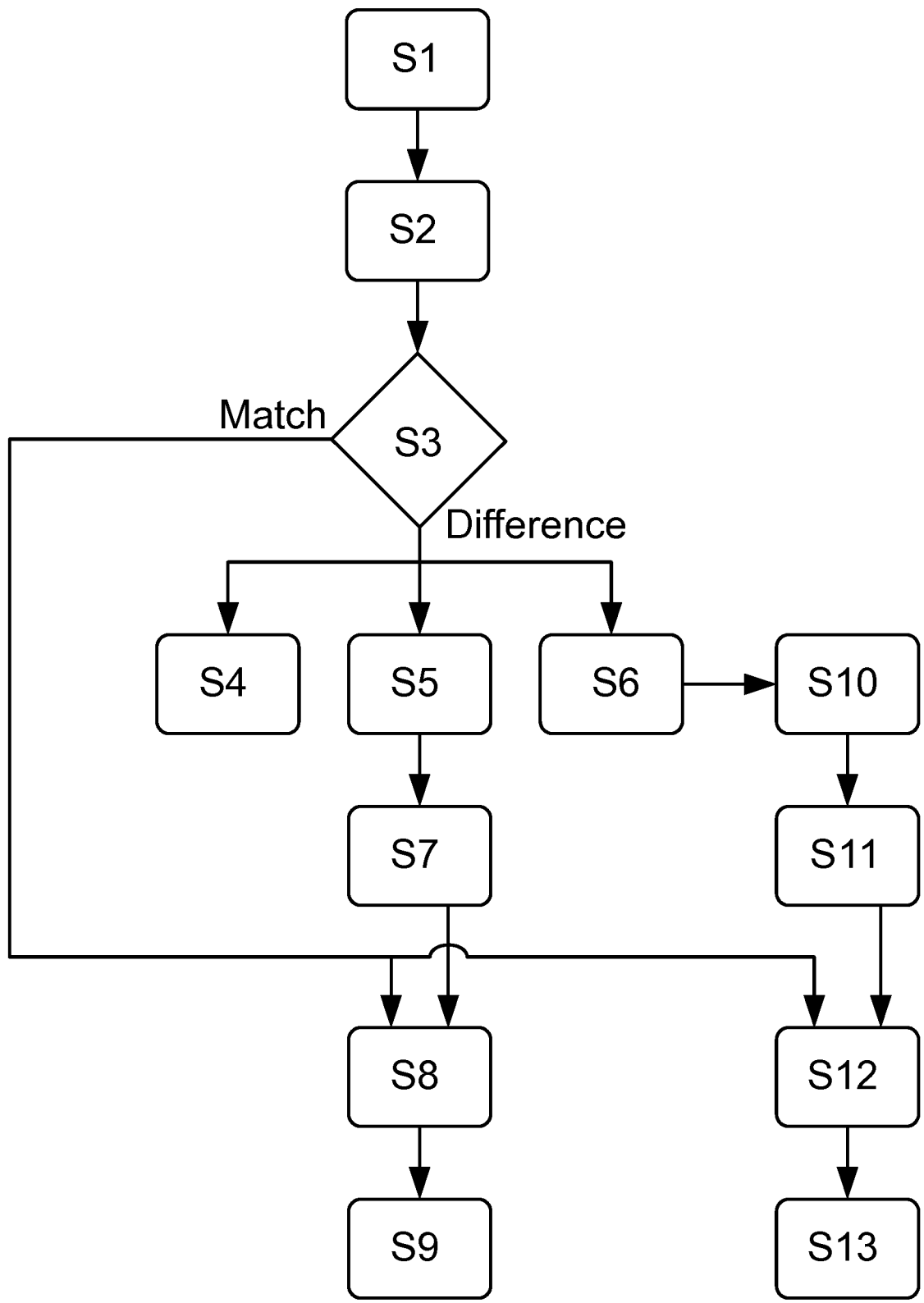
FIG. 2 is a flow chart according to aspects of the invention.

With further reference to FIG. 2, error of at least one of the ego vehicle 10 and the surrounding vehicle 12 may be diagnosed as follows.

In step S1, the ego vehicle 10 receives sensor data about the surrounding vehicle 12 from the on-board sensor 14 and vehicle to vehicle data from the surrounding vehicle 12 via the vehicle to vehicle communications unit 16. The ego vehicle 10 should know that it receives sensor data about, and vehicle to vehicle data from, the same surrounding vehicle 12. To this end, the ego vehicle 10 and the surrounding vehicle 12 may form part of a platoon, and/or the ego vehicle may identify the surrounding vehicle 12 as in the co-pending international application no. PCT/EP2016/057331 "METHOD FOR VEHICLE IDENTIFICATION"; Volvo Truck Corporation (the content of which herein is incorporated by reference), for example.

In step S2, the ego vehicle 10 compares the received sensor data and the received vehicle to vehicle data.

In step S3, the ego vehicle 10 detects if there is a difference between the received sensor data and the received vehicle to vehicle data. The detected difference does not have to be just any difference, but preferably a difference outside a (predetermined) margin, e.g. with respect to magnitude and/or timing. For example, if the received sensor data indicates 50 km/h and the received vehicle to vehicle data indicates 57 km/h, a difference may be detected because it is outside a margin of +/−10%. On the other hand, if the received sensor data indicates 50 km/h and the received vehicle to vehicle data indicates 52 km/h, a difference may not be detected because it is inside the +/−10% margin.

If the ego vehicle 10 detects a difference in step S3 (or in response to the ego vehicle 10 detecting a difference in step S3), the ego vehicle 10 stops receiving vehicle to vehicle data from the surrounding vehicle 12 via the vehicle to vehicle communications unit 16 (step S4), registers a potential error of the ego vehicle 10 in the ego vehicle 10 and/or in the remote server 18 (step S5), and reports a potential error of the surrounding vehicle 12 to the surrounding vehicle 12 via the vehicle to vehicle communications unit 16 and/or to the remote server 18 (step S6).

Figure 1B:
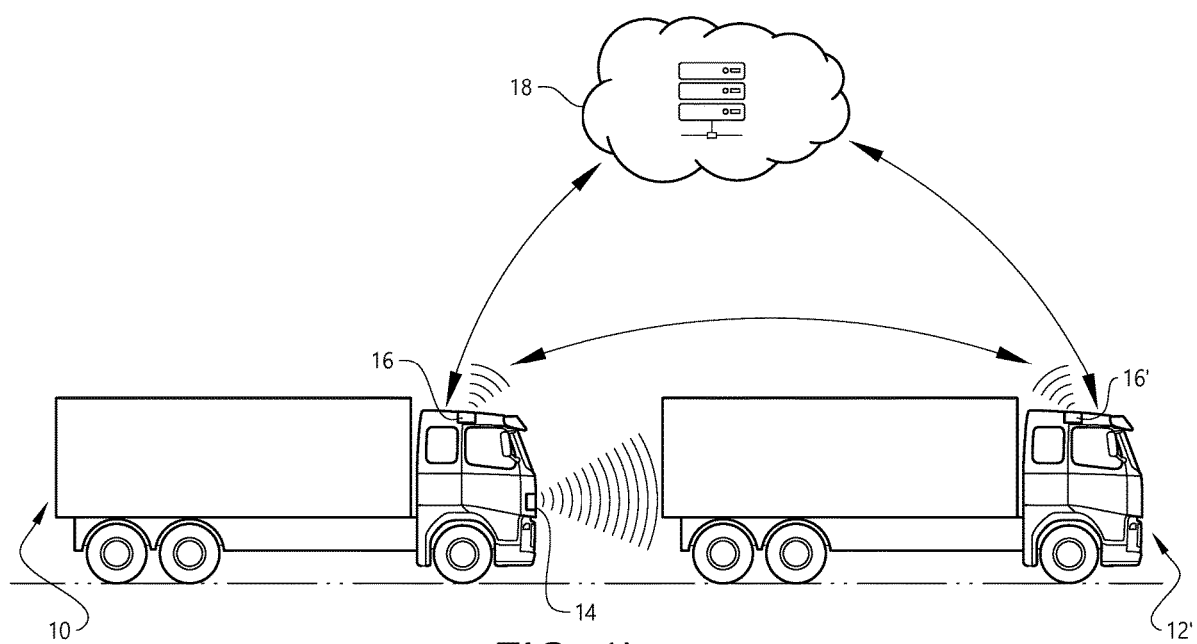

The steps S1-S6 may be repeated for at least one other surrounding vehicle 12', see FIG. 1b. That is, the ego vehicle 10 may further detect a difference between received sensor data and received vehicle to vehicle data of at least one other surrounding vehicle 12' and register at least one other potential error of the ego vehicle 10.

Each registered potential error of the ego vehicle 10 increases a fault counter of the ego vehicle 10 (step S7), and an error of the ego vehicle 10 is declared if the fault counter of the ego vehicle exceeds a predetermined threshold (step S8). The fault counter of the ego vehicle 10 may be maintained in at least one of the ego vehicle 10 and the remote server 18.

Figure 3:
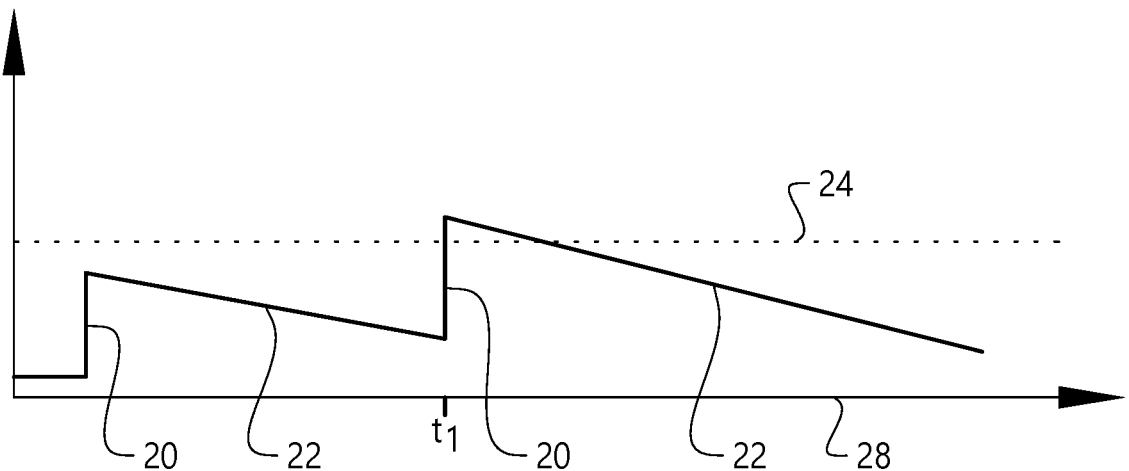
FIG. 3 is a graph of a fault counter according to an embodiment of the invention.
Figure 4:
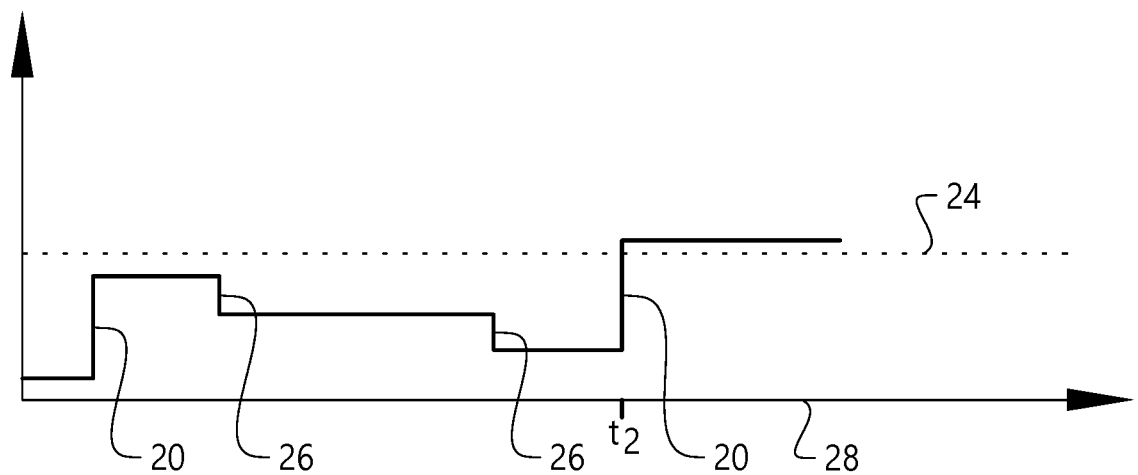
FIG. 4 is a graph of a fault counter according to another embodiment of the invention.

Exemplary fault counters of the ego vehicle 10 are shown in FIGS. 3-4.

In FIG. 3, the fault counter is on the vertical axis, and time is on the horizontal axis. As mentioned above, each registered potential error of the ego vehicle 10 increases the fault counter as illustrated by 20, but the fault counter of the ego vehicle 10 is also decreased over time as illustrated by 22. The fault counter of the ego vehicle 10 may be decreased over time actual time, or only over the time that the ego vehicle 10 is connected to a surrounding vehicle 12; 12' via vehicle to vehicle communication. In the example of FIG. 3, the fault counter exceeds the predetermined threshold 24 after two potential errors have been registered with respect to two different surrounding vehicles 12; 12' in a short enough succession, whereby an error of the ego vehicle 10 is declared at $t_1$.

In FIG. 4, the fault counter is on the vertical axis, and time is on the horizontal axis. As mentioned above, each registered potential error of the ego vehicle 10 increases the fault counter as illustrated by 20. However, here the ego vehicle 10 further detects a match between received sensor data and received vehicle to vehicle data of a surrounding vehicle 12; 12' (see step S3 in FIG. 2), wherein each match decreases the fault counter of the ego vehicle 10 as illustrated by 26. Between registered potential errors and detected matches, the fault counter is here constant. A detected match does not have to be an exact match, but preferably a match within a (predetermined) margin, e.g. with respect to magnitude and/or timing. For example, if the received sensor data indicates 50 km/h and the received vehicle to vehicle data indicates 52 km/h, a match may nevertheless be detected because the difference in speed is inside a margin of +/−10%. Furthermore, in order to detected a match, the received sensor data and vehicle to vehicle data should preferably match for at least a minimum duration in the range of 10-20 minutes, for example 15 minutes, and only one such match can be detected every 1-3 hours, for example every two hours, not to detect excessive matches. Furthermore, each registered potential error of the ego vehicle 10 may increase the fault counter of the ego vehicle 10 by a greater amount than what each match decreases the fault counter of the ego vehicle 10, as illustrated in FIG. 4. In the example of FIG. 4, the fault counter exceeds the predetermined threshold 24 after two potential errors have been registered with respect to two different surrounding vehicles 12; 12' without enough matches to compensate, whereby an error of the ego vehicle 10 is declared at $t_2$.

Preferably, the fault counter of the ego vehicle 10 in both FIGS. 3-4 cannot be decreased below a predetermined limit 28, regardless of how long time that lapses between registered potential errors (FIG. 3) or how many matches that are detected (FIG. 4).

If an error of the ego vehicle 10 is declared in step S8, use of sensor data from the on-board sensor 14 may be inhibited (step S9), for example. Use of sensor data may be inhibited by the ego vehicle 10 itself in case the fault counter of the ego vehicle 10 is maintained in the ego vehicle 10, or remotely by the remote server 18 in case the fault counter of the ego vehicle 10 is maintained in the remote server 18. In another variant, the ego vehicle 10 may inform the remote server 18 of the declared error, wherein the remote server 18 inhibits the use of sensor data from the on-board sensor 14 in the ego vehicle. In any case, the user/driver of the ego vehicle 10 may be informed accordingly and instructed to bring the ego vehicle 10 to service.

The remote server 18 may further be adapted to maintain a list of vehicles with declared errors, including the ego vehicle 10. The list can be made available to all vehicles communicating with the remote server 18. The list could also be used when distributing pseudonyms to efficiently prevent erroneous vehicles from communicating with other vehicles.

Figure 1C:
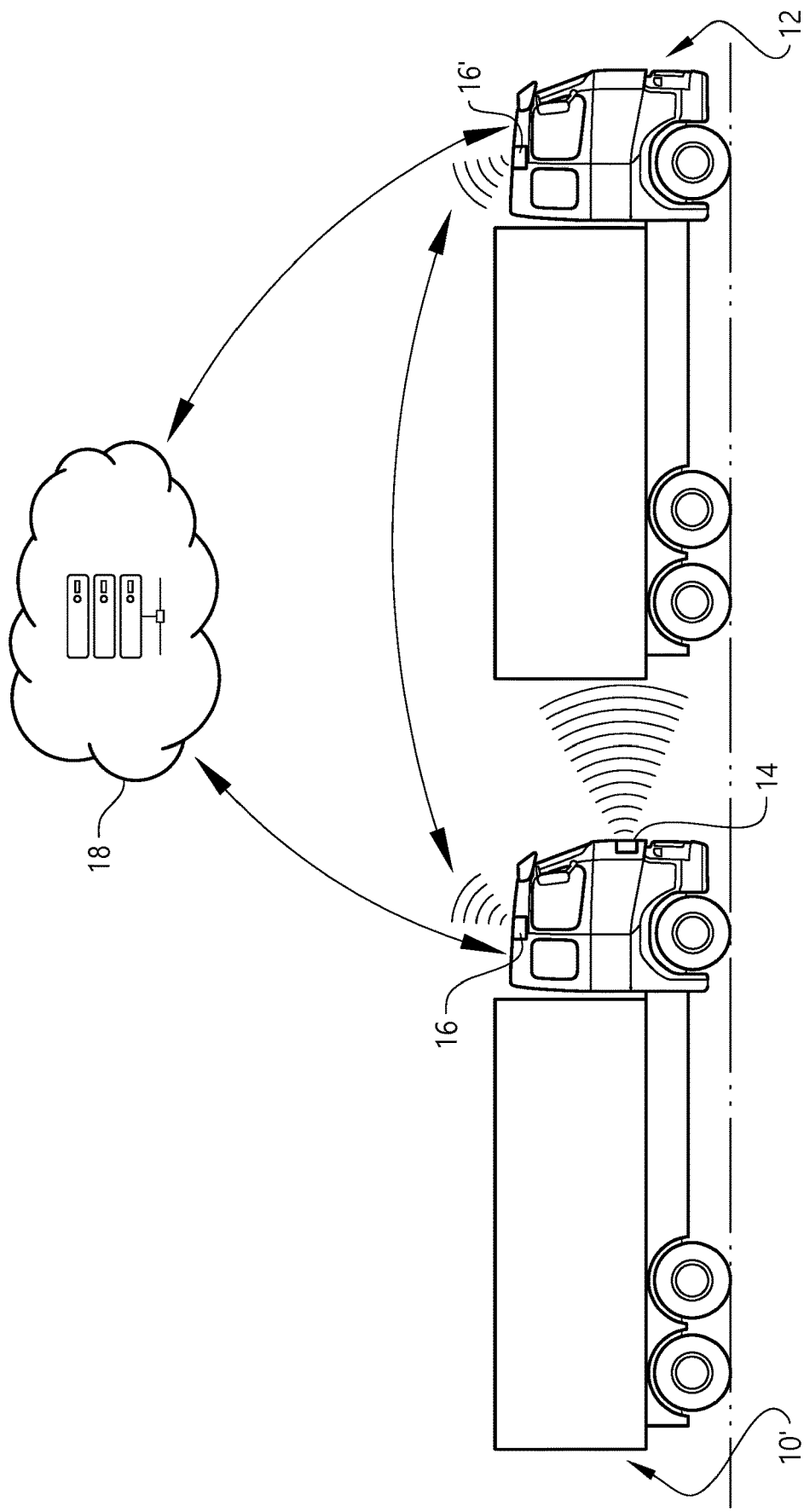

Turning to the surrounding vehicle 12, it may in step S10 receive the potential error of the surrounding vehicle 12 reported from the ego vehicle 10 in step S6 via the vehicle to vehicle communications unit 16'. Step S10 may be repeated for at least one other ego vehicle 10', see FIG. 1c. That is, the surrounding vehicle 12 may receive at least one other potential error of the surrounding vehicle 12 reported from at least one other ego vehicle 10'.

Each received potential error of the surrounding vehicle 12 increases a fault counter of the surrounding vehicle 12 (step S11), wherein an error of the surrounding vehicle 12 is declared if the fault counter of the surrounding vehicle 12 exceeds a predetermined threshold (step S12). The fault counter of the surrounding vehicle 12 may be maintained in at least one of the surrounding vehicle 12 and the remote server 18. In the latter case, the potential errors of the surrounding vehicle 12 may be received in the remote server 18 (step S10). The fault counter of the surrounding vehicle 12 may be the same as the fault counters of the ego vehicle 10 as described in relation to FIGS. 3-4, though the predetermined thresholds 24 may be different.

If an error of the surrounding vehicle 12 is declared in step S12, the surrounding vehicle 12 may be inhibited to send vehicle to vehicle data (step S13). The surrounding vehicle 12 may be inhibited to send vehicle to vehicle data by the surrounding vehicle 12 itself in case the fault counter of the surrounding vehicle 12 is maintained in the surrounding vehicle 12, or remotely by the remote server 18 in case the fault counter of the surrounding vehicle 12 is maintained in the remote server 18. In another variant, the surrounding vehicle 12 may inform the remote server 18 of the declared error, wherein the remote server 18 inhibits the surrounding vehicle 12 to send vehicle to vehicle data. In any case, the user/driver of the surrounding vehicle 12 may be informed accordingly and instructed to bring the surrounding vehicle 12 to service.

The error declared in the surrounding vehicle 12 may be caused by the vehicle to vehicle communications unit 16' being faulty or by a faulty sensor of the surrounding vehicle 12 supplying data to the vehicle to vehicle communications unit 16'. To this end, information about the fault could for example pinpoint that the speed signal over vehicle to vehicle communication is in error, implying that the speed sensor of the surrounding vehicle 12 is defective, rather than the vehicle to vehicle communications unit 16'.

The surrounding vehicle 12 may also be included on the list of vehicles with declared errors maintained by the remote server 18.

It should be noted that the ego vehicle 10 also can "act" as a surrounding vehicle, in that the ego vehicle 10 (and/or the remote server 18) may receive a potential error of the ego vehicle reported from another ego vehicle 10" (see FIG. 1d), and an error of the ego vehicle 10 may be declared accordingly based on potential errors of the ego vehicle reported from other ego vehicles. Likewise, the surrounding vehicle 12 can also "act" as an ego vehicle, in that it may perform steps S1-S6, wherein an error of the surrounding vehicle may be declared based on potential errors of the surrounding vehicle registered by itself. Hence, there may be two fault counters for each vehicle 10, 12: one for potential errors registered by itself and one for potential errors reported by other vehicles. Having two different fault counters may improve traceability.

It is to be understood that the present invention is not limited to the embodiments described above and illustrated in the drawings; rather, the skilled person will recognize that many changes and modifications may be made within the scope of the appended claims.

The invention claimed is:

1. A method for diagnosing error of at least one of an ego vehicle and a surrounding vehicle, comprising:
   receiving, by the ego vehicle, sensor data about the surrounding vehicle from an on-board sensor of the ego vehicle and vehicle to vehicle data from the surrounding vehicle;
   comparing, by the ego vehicle, the received sensor data and the received vehicle to vehicle data; and
   detecting, by the ego vehicle, a difference between the received sensor data and the received vehicle to vehicle data;
   stopping, by the ego vehicle, receiving vehicle to vehicle data from the surrounding vehicle;
   registering, by the ego vehicle, a potential error of the ego vehicle; and
   reporting, by the ego vehicle, a potential error of the surrounding vehicle to at least one of the surrounding vehicle and a remote server.

2. The method of claim 1, further comprising:
   increasing, by the ego vehicle, a fault counter of the ego vehicle based on each registered potential error of the ego vehicle, and
   declaring, by the ego vehicle, an error of the ego vehicle if the fault counter of the ego vehicle exceeds a predetermined threshold.

3. The method of claim 2, wherein at least two registered potential errors with respect to different surrounding vehicles are needed to exceed the predetermined threshold and declare an error of the ego vehicle.

4. The method of claim 2, wherein further comprising inhibiting, by the ego vehicle, use of sensor data from the on-board sensor if an error of the ego vehicle is declared.

5. The method of claim 2, further comprising decreasing, by the ego vehicle, the fault counter of the ego vehicle over time.

6. The method of claim 2, further comprising detecting, by the ego vehicle, a match between received sensor data and received vehicle to vehicle data of at least one other surrounding vehicle, wherein each match decreases the fault counter of the ego vehicle.

7. The method of claim 6, further comprising increasing, by the ego vehicle, the fault counter of the ego vehicle, based on each registered potential error of the ego vehicle, by a greater amount than what each match decreases the fault counter of the ego vehicle.

8. The method of claim 5, wherein the fault counter of the ego vehicle cannot be decreased below a predetermined limit.

9. The method of claim 1, wherein the ego vehicle reports the potential error to the remote server, which maintains a fault counter based on each registered potential error of the ego vehicle.

10. The method of claim 1,
wherein the ego vehicle reports the potential error to the surrounding vehicle which increases a fault counter of the surrounding vehicle.

11. The method of claim 1, further comprising:
receiving, by the ego vehicle, a potential error of the ego vehicle reported from another ego vehicle;
increasing, by the ego vehicle, a fault counter of the ego vehicle, based on each received potential error of the ego vehicle; and
declaring, by the ego vehicle, an error of the ego vehicle if the fault counter of the ego vehicle exceeds a predetermined threshold.

12. A method for diagnosing error of a surrounding vehicle, comprising:
receiving a potential error of the surrounding vehicle reported from an ego vehicle; and
receiving at least one other potential error of the surrounding vehicle reported from at least one other ego vehicle, wherein each received potential error increases a fault counter of the surrounding vehicle, and wherein an error of the surrounding vehicle is declared if the fault counter of the surrounding vehicle exceeds a predetermined threshold.

\* \* \* \* \*